W. J. LUTTRELL.
CULTIVATOR ATTACHMENT.
APPLICATION FILED JUNE 8, 1910.
973,284.
Patented Oct. 18, 1910.
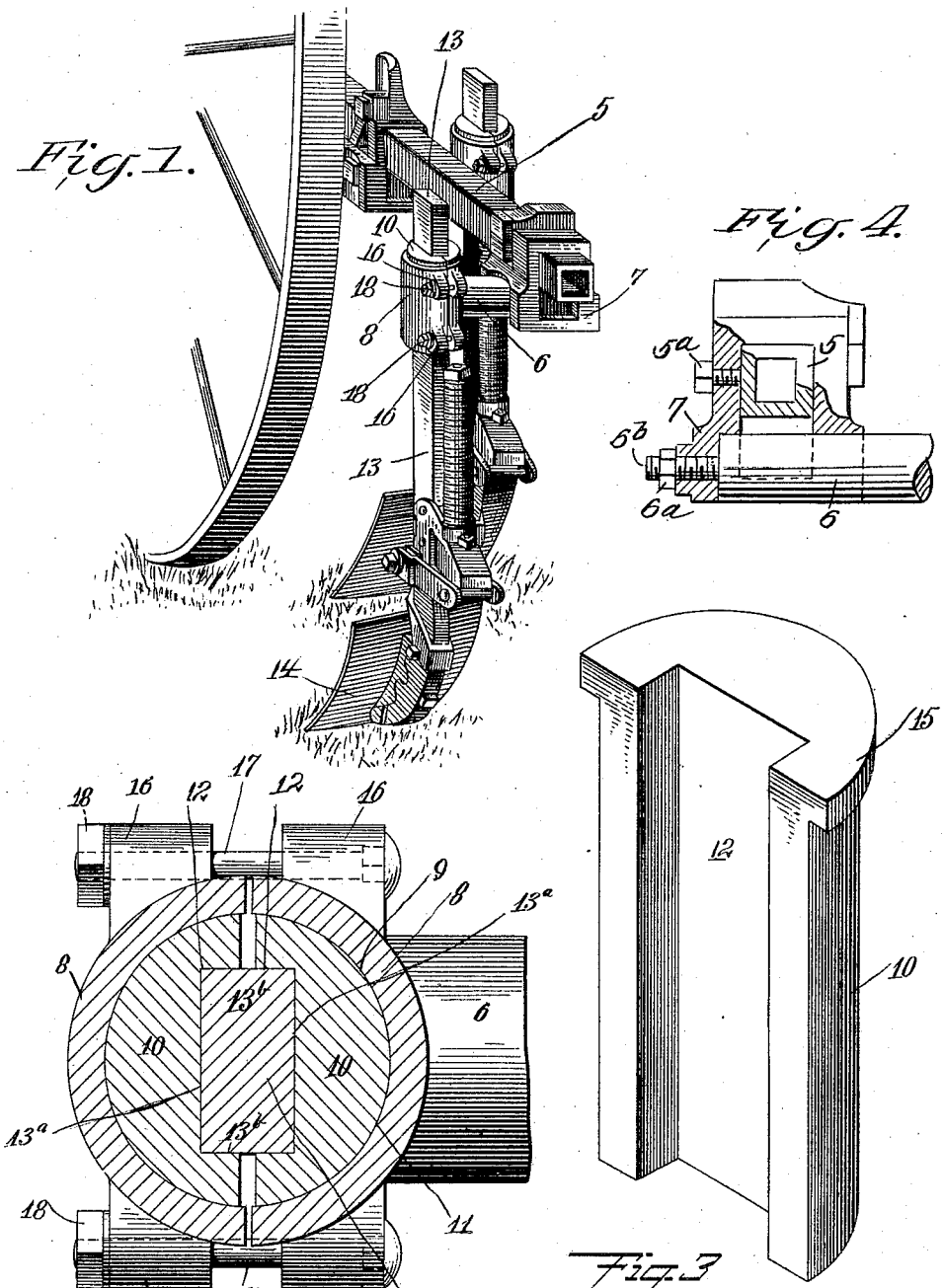
WITNESSES:
E. G. Bromley,
E. B. Marshall
INVENTOR
William J. Luttrell.
BY Munn & Co
ATTORNEYS

UNITED STATES PATENT OFFICE.

WILLIAM JACKSON LUTTRELL, OF HONEY GROVE, TEXAS.

CULTIVATOR ATTACHMENT.

973,284.

Specification of Letters Patent. Patented Oct. 18, 1910.

Application filed June 8, 1910. Serial No. 565,691.

*To all whom it may concern:*

Be it known that I, WILLIAM J. LUTTRELL, a citizen of the United States, and a resident of Honey Grove, in the county of Fannin and State of Texas, have invented a new and Improved Cultivator Attachment, of which the following is a full, clear, and exact description.

My invention relates to cultivator attachments, and it has for its object to provide a new means for securing the shank of the shovel, or blade, to the cross head in a rigid beam cultivator. In my device the shank of the shovel, which is angular in cross section, is disposed between clamp blocks, angular on their inner sides, to engage the shank, and annular on their outer sides, the clamp blocks being disposed between clamp members and having circular openings. By the use of the angular shank, with the clamp blocks, there is considerable friction of the parts, should the shovel meet an obstruction having a tendency to turn it relatively to the clamp members. However, while this is true, the clamp blocks permit the adjustment of the shank relatively to the clamp members, both as to the distance of the shovel from the clamp members and also the angle of the shovel relatively to the clamp members. When the round shank is used, experience has shown that there is not sufficient friction, under all conditions, to hold the shank firmly in place and the poor results obtained are a great annoyance and trouble to farmers. All this is overcome with my attachment.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a perspective view of a draft beam, to which my attachment is secured; Fig. 2 is a sectional plan view of my attachment; Fig. 3 is a perspective view of one of the clamp blocks; and Fig. 4 is a fragmentary sectional view showing the band clamp and the draft bar.

By referring to the drawings, it will be seen that to the draft bar 5 is secured a cross head 6. The cross head 6 is held in place on the band clamp 7 in the usual way by means of a nut $6^a$, which engages a threaded terminal $6^b$ of the cross head 6, the band clamp 7 being held in place on the draft bar 5 in the usual manner by means of a set screw $5^a$.

To the cross head 6 is secured one of two companion clamp members 8, these clamp members 8 having circular openings 9 in which are normally disposed two clamp blocks 10, these clamp blocks 10 having annular outer surfaces 11 and openings 12, the walls of these openings 12 being disposed at angles to each other, so that they will engage snugly the shank 13 of the shovel 14, the shank being angular in cross section. As shown in the drawings, I prefer to construct the shank 13 with four sides, the sides $13^a$ being disposed against the rear walls of the openings 12 in the clamp blocks and the sides $13^b$ of the shank 13 being disposed against the side walls of the openings 12.

As shown in Fig. 3 of the drawings, each of the clamp blocks 10 is provided with an annular outer projection 15 at its top, these annular projections 15 being adapted to rest on the top of the clamp members 8, so that the clamp blocks 10 will be supported while the shank 13 is being adjusted. The clamp members 8 have flanges 16, having orifices through which are disposed bolts 17, nuts 18 being provided for these bolts 17, the bolts 17 and the nuts 18 being adapted to draw the clamp members 8 together to press the clamp blocks 10 against the shank 13.

In using the invention, the nuts 18 are unscrewed and the shank 13 is raised, or is lowered, as desired, in order that the shovel 14 will be disposed in a correct position relatively to the ground. This having been done, the clamp blocks 10 are rotated relatively to the clamp members 8, so that the shovel 14 on the shank 13 will have its face disposed at the desired angle relatively to the path of travel of the cultivator. This having been done, the nuts 18 are turned home, when it will be found that the shank 13 will be held firmly in position under all conditions.

Having thus described my invention, I claim as new and desire to secure by Letters Patent:

1. In combination with a draft beam, two companion clamp members having circular openings respectively, means for securing one of the clamp members relatively to the draft beam, means for securing the other clamp member to the clamp member secured to the draft beam, and two clamp blocks, each having an opening with angularly-disposed walls and an annular outer surface, the clamp blocks being normally disposed between the clamp members and being adapted to be disposed around the shank of a shovel member.

2. In combination with a draft beam, two companion clamp members having circular openings respectively, means for securing one of the clamp members relatively to the draft beam, means for securing the other clamp member to the clamp member secured to the draft beam, two clamp blocks, each having an opening with angularly-disposed walls and an annular outer surface, projections on the clamp blocks for resting on the top of the clamp members when the clamp members are disposed around the clamp blocks, and a shank of a shovel member disposed between the clamp blocks, to be held thereby.

In testimony whereof I have signed my name to this specification in the presence of two subscribing witnesses.

WILLIAM JACKSON LUTTRELL.

Witnesses:
L. N. BRODE,
J. A. WILLSON.